Aug. 7, 1951
I. E. MATHER
2,563,732
PRESSURE GAUGE
Filed Aug. 1, 1945
2 Sheets-Sheet 1
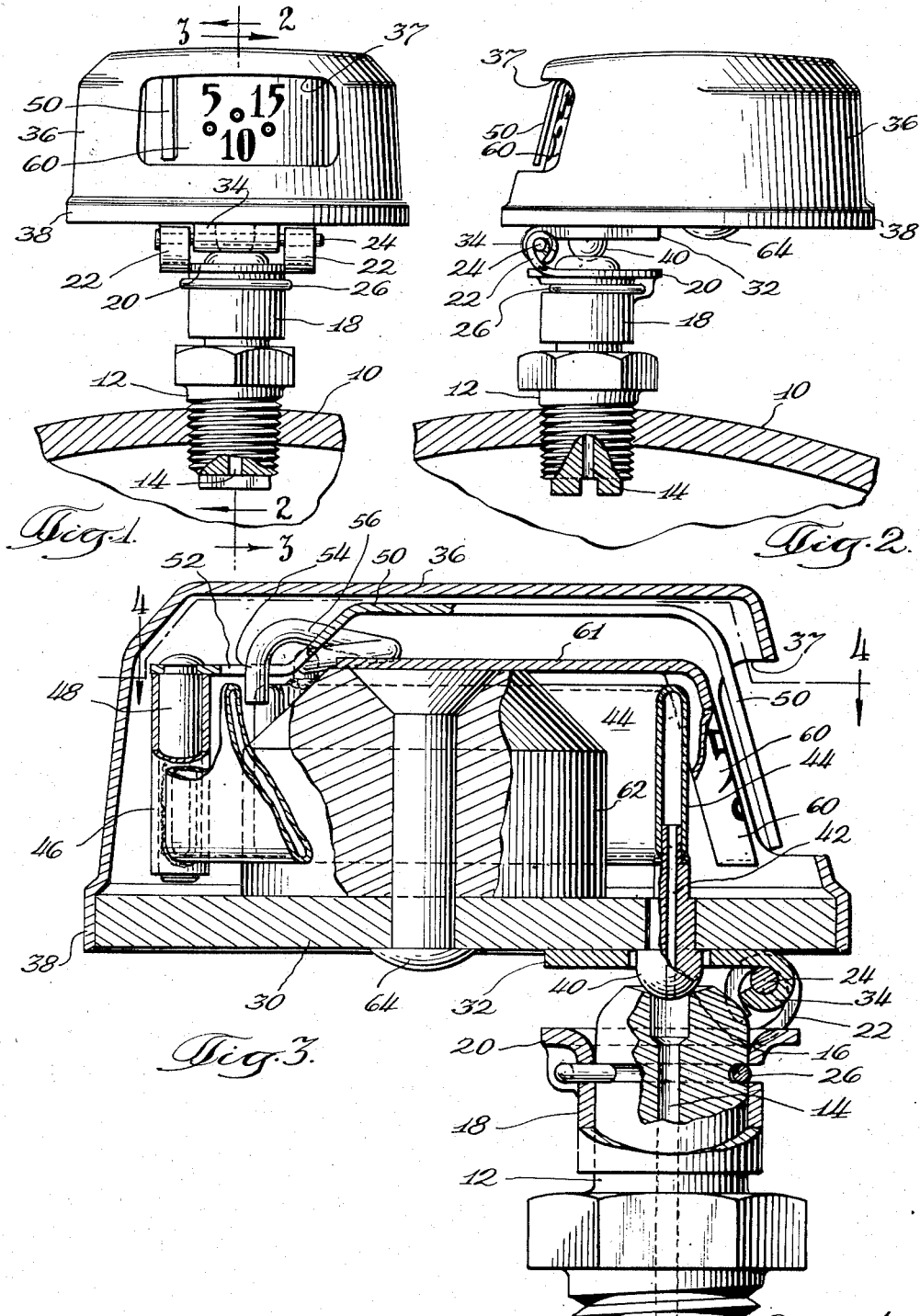

Aug. 7, 1951     I. E. MATHER     2,563,732
PRESSURE GAUGE
Filed Aug. 1, 1945     2 Sheets-Sheet 2

Inventor:
Irwin E. Mather
By Williams, Bradbury & Hinkle
attorneys

Patented Aug. 7, 1951

2,563,732

UNITED STATES PATENT OFFICE 2,563,732

PRESSURE GAUGE

Irwin E. Mather, Chicago, Ill., assignor to Stewart-Warner Corporation, Chicago, Ill., a corporation of Virginia Application August 1, 1945, Serial No. 608,131

1 Claim. (Cl. 137—53)

This invention relates to a pressure gauge and particularly to a gauge designed for indicating steam pressure in a pressure cooker, and one object of the invention is to provide such a gauge with new and improved mounting means through which the steam pressure is transmitted to the indicating mechanism of the gauge.

Another object of the invention is to provide a new and improved gauge device mounted externally on the wall of a pressure chamber by means of a hinged connection adapting the gauge to serve as a relief valve and so arranged that the weight of the gauge and the distance from the hinge center line to the valve center line determines the pressure at which the valve will open.

It is also an object of the invention to provide a pressure gauge of the Bourdon tube type with an improved and simplified linkage between the pressure responsive tube and the indicating mechanism.

Other objects and advantages of the invention will appear from the following description taken in connection with the drawings, in which:

Fig. 1 is a front elevation of a pressure gauge embodying this invention and showing in section a fragment of a pressure chamber wall in which the gauge is mounted;

Fig. 2 is a side elevation of the gauge with the supporting wall of the pressure chamber shown in section as indicated at line 2—2 on Fig. 1;

Fig. 3 is a vertical axial section on a larger scale taken as indicated at line 3—3 on Fig. 1, and also at line 3—3 on Fig. 4;

Figure 4:
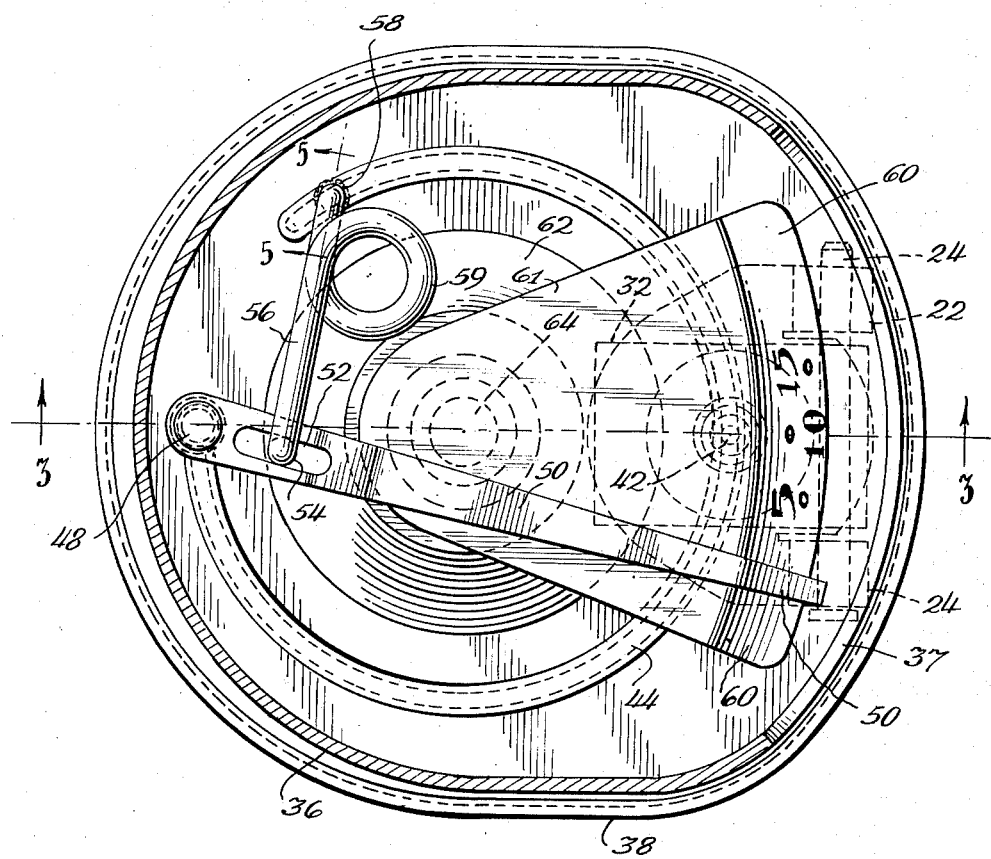
Fig. 4 is a top plan view of the internal mechanism of the gauge as it appears with the cover removed, being taken as a section as indicated at line 4—4 on Fig. 3.
Figure 5:
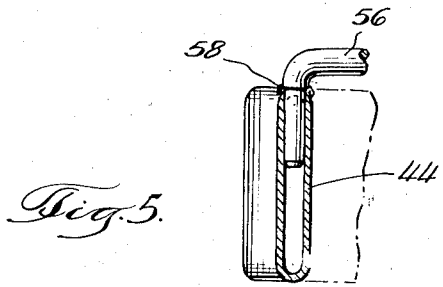
Fig. 5 is a detail sectional view taken as indicated at line 5—5 on Fig. 4.

The gauge and supporting structure embodying this invention and shown in the drawings is particularly intended for use with a pressure cooker but it will be recognized that it may be applicable to various other situations in which it is desirable to have an indication of the pressure within a closed vessel and to automatically relieve the pressure when it reaches a predetermined value. As shown in Figs. 1 and 2, a wall of the vessel indicated at 10 is tapped to receive a threaded fitting 12 having an axial bore or passage 14 through which the steam or other pressure fluid within the chamber has access to the pressure responsive mechanism of the gauge device. The passage 14 terminates in an upwardly facing valve seat 16 and there is secured to the upper end of the fitting 12 a sleeve 18 having a flange 20 with hinge lugs 22, 22 extending upwardly therefrom and curled around a hinge pivot 24. A snap ring 26 locks the sleeve 18 in position on the upper end of the fitting 12.

The gauge device includes a base plate 30 to which the hinge leaf 32 is welded or otherwise rigidly secured, said leaf having a portion 34 curled about the hinge pivot 24 to complete the hinged connection between the fitting 12 and the gauge device. A protective shell or cover 36 fits over the internal mechanism of the gauge and includes a skirt flange 38 which is tightly fitted over the rim of the base plate 30 and may be additionally secured thereto if desired.

Directly over the passage 14 in the fittting 12 there is secured in the base plate 30 a valve member 40 preferably having a spherically rounded lower end portion adapted to fit the valve seat 16 and having an axial passage 42 extending upwardly into communication with the pressure responsive mechanism of the gauge. This mechanism includes a Bourdon tube 44 into which the upper end of the member 40 is fitted and sealed at a position intermediate the ends of the Bourdon tube so that upon the application of internal pressure by way of the passage 42 both ends of the tube will respond by flexure, tending to move outwardly from their initial positions—that is, away from the axis about which the tube is approximately concentric in its initial form. The connection between the Bourdon tube 44 and the upstanding end portion of the member 40 not only serves to transmit fluid pressure to the interior of the tube, but acts also as the support for the tube by which its free ends are held at a distance above the upper side of the base plate 30 for flexure in response to the pressure applied to the tube. A sleeve 46 is soldered or otherwise firmly secured to one end of the tube 44, and a shaft 48 riveted to the end of a pointer arm 50 is pivotally journalled in the sleeve 46. The arm 50 is slotted at 52 at a short distance from the axis of the shaft 48 and is engaged by the downwardly bent end portion 54 of a wire link 56 having its opposite end soldered or welded to the other end of the Bourdon tube 44 at 58. Intermediate its ends, the link 56 is coiled or bent into a single circular turn 59 so that the effective length of the link may be varied readily by expanding or compressing this coil in the process of calibrating the instrument.

After calibration, the link 56 acts as a substantially rigid extension of the end of the tube 44 to which it is secured, and as an increase of fluid pressure applied to the interior of the tube 44 tends to straighten its curvature, both free ends of the tube will be moved outwardly toward the enclosing cover 36. This movement, transmitted to the pointer 50 by the link 56, will swing the pointer over the dial plate 60, and at the same time the movement of the other end of the tube 44 which is attached to the pivot 48 will operate to rock the arm 50 about the end 54 of the link 56 as a fulcrum, thus producing additional movement of the free end of the pointer 50 over the dial 60. The dial 60 is suitably graduated and marked to correspond with the range of pressures which the instrument is calibrated to indicate.

By virtue of the hinged connection of the base 30 to the fitting 12, and the fact that the axis of the hinge pivot 24 is disposed near one edge of the base 30 while the center of gravity of the pressure gauge is at some distance from the hinge pivot, the weight of the gauge operates to hold the valve member 40 seated over the end of the passage 14, and since the Bourdon tube 44 is closed at both ends there is no escape for the pressure fluid such as the steam of a steam cooker so long as the valve 40 remains seated. However, if the pressure rises beyond a predetermined value depending upon the weight of the pressure gauge, it will lift the valve 40 off its seat, swinging the gauge upwardly about its hinge pivot 24 to relieve the excess of pressure within the chamber. Since the functioning parts of the gauge are relatively light, a weight 62 in the form of a circular block, preferably of metal, is secured to the base plate 30 as by means of a rivet 64, and is disposed within the generally circular outline of the Bourdon tube 44 but with ample clearance so that it will not interfere with the operation of the gauge. In this manner sufficient weight is added to the structure to hold the valve 40 in closed position through the desired pressure range. Incidentally, the block 62 and the upper end of the rivet 64 may serve to support the horizontal portion 61 of the dial plate 60 with the dial 60 inclined slightly at a convenient reading angle and overhanging the Bourdon tube 44 as clearly shown in Figs. 3 and 4. The cover 36 is formed with a window 37 opposite the inclined dial plate 60 to permit observation of the pointer 50 as it traverses the dial.

Preferably, the lugs 22, 22 are formed to fit loosely around the hinge pivot 24 to permit the valve member 40 to find and take its seating position without requiring any special precision work in locating the valve member in relation to the hinge axis.

Some changes may be made in the construction and arrangement of the parts of the device without departing from the real spirit and purpose of this invention, and it is the intention to cover by the claim any modifications or mechanical equivalents which may be reasonably included within its scope.

I claim:

A combined pressure gauge and valve for a pressure-relief fitting on a pressure cooker or the like, said fitting having an upwardly open relief port and a valve seat associated therewith, said pressure gauge being hinged to said fitting upon a horizontal axis located on the opposite side of the valve seat from the center of gravity of the gauge and including a substantially horizontal base, a valve member secured in and extending through said base and having a portion below the base between the center of gravity of the gauge and the hinge connection formed to seat over said port, said member also having a portion extending upwardly from the base, the gauge including a Bourdon tube supported by said upwardly extending portion of the valve member, said portion being secured rigidly in the tube in sealed relation thereto and said member having a passage extending through it and connecting the said port with the interior of the Bourdon tube, said Bourdon tube being of approximately circular form, and a weight mounted on said base within the curved outline of said tube and with its center of gravity disposed at the same side of said hinge axis as the valve seat and beyond it whereby the weight exerts a multiplied force to oppose the opening of the valve.

IRWIN E. MATHER.

REFERENCES CITED

The following references are of record in the file of this patent:

UNITED STATES PATENTS

| Number | Name | Date |
| --- | --- | --- |
| 103,893 | Kent | June 7, 1870 |
| 347,516 | Sargent | Aug. 17, 1886 |
| 708,527 | Calder | Sept. 9, 1902 |
| 1,508,696 | Jacobs | Sept. 16, 1924 |
| 1,751,867 | Manuel | Mar. 25, 1931 |
| 1,835,561 | Eshbaugh | Dec. 8, 1931 |
| 2,200,903 | Stephens | May 14, 1940 |
| 2,365,962 | Kahn | Dec. 26, 1944 |
| 2,448,893 | Lamar | Sept. 7, 1948 |